(12) United States Patent
Duffy et al.

(10) Patent No.: US 6,209,682 B1
(45) Date of Patent: Apr. 3, 2001

(54) LADDER ASSEMBLY FOR TRACK-TYPE TRACTORS

(75) Inventors: Joseph F. Duffy, Metamora; Lionel A. Martin, Hopedale; Steven C. Swanson, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/502,474

(22) Filed: Feb. 11, 2000

(51) Int. Cl.[7] ...................................... B60R 3/00
(52) U.S. Cl. .............................. 182/127; 182/97; 280/166
(58) Field of Search ....................... 182/127, 97; 280/166

(56) References Cited

U.S. PATENT DOCUMENTS

| | | |
|---|---|---|
| 2,967,584 | 1/1961 | Westerlund . |
| 3,113,637 | 12/1963 | Pasko, Jr. . |
| 3,190,392 | 6/1965 | Ashton et al. . |
| 3,232,376 | 2/1966 | Lucas et al. . |
| 3,508,627 | 4/1970 | Lypko et al. . |
| 3,601,220 | 8/1971 | Saucier . |
| 3,656,578 | 4/1972 | Hemken . |
| 3,869,022 | 3/1975 | Wallk . |
| 3,989,122 | 11/1976 | Jenkins . |
| 3,997,183 | 12/1976 | Russey . |
| 4,021,071 | 5/1977 | Norman . |
| 4,067,588 | 1/1978 | Morge et al. . |
| 4,131,293 | 12/1978 | Kindle . |
| 4,139,078 | 2/1979 | Keller . |
| 4,161,997 | 7/1979 | Norman . |
| 4,243,120 | 1/1981 | Pratt, Jr. et al. . |
| 4,245,716 | 1/1981 | Rayfield . |
| 4,333,547 | 6/1982 | Johansson . |
| 5,033,582 | 7/1991 | Hoben . |
| 5,064,022 | 11/1991 | Graham . |
| 5,064,023 | 11/1991 | Loeber . |
| 5,129,168 | 7/1992 | Hedley . |
| 5,163,531 | 11/1992 | Whiting . |
| 5,174,411 | 12/1992 | Oliver et al. . |
| 5,339,919 | 8/1994 | Boyd . |
| 5,366,052 | 11/1994 | Keh-Lin . |
| 5,469,933 | 11/1995 | Thomason . |
| 5,538,100 | 7/1996 | Hedley . |
| 5,588,768 | 12/1996 | Hedley . |
| 5,624,127 | 4/1997 | Arreola et al. . |
| 5,687,813 | 11/1997 | Bensch . |

*Primary Examiner*—Alvin Chin-Shue
(74) *Attorney, Agent, or Firm*—Calvin E. Glastetter

(57) ABSTRACT

Access to an operator station of a large track-type tractor is provided by a ladder support structure pivotally attached to a portion of the radiator guard of the tractor. The ladder support structure extends over a track of the tractor and has a ladder pivotally attached to a distal end of the ladder support structure that provides steps over a push arm and a tilt cylinder of the tractor. When the ladder assembly is moved to its carry position, the ladder is moved to a position inside the ladder support structure, and the ladder support structure raised to a vertical position adjacent a side panel of the radiator guard of the tractor. The present invention avoids the problem of machine operators climbing on the push arms, tilt cylinders, radiator, radiator guard, track, hood, and engine enclosures in order to gain access to the operator station.

5 Claims, 2 Drawing Sheets

US 6,209,682 B1

LADDER ASSEMBLY FOR TRACK-TYPE TRACTORS

DESCRIPTION

1. Technical Field

This invention relates generally to a ladder assembly for providing access to, and egress from, an operator station of a large track-type tractor, and more particularly to such a ladder assembly that provides access and egress to the operator station from a forward side of the tractor.

2. Background Art

Typically, an operator, or other worker, climbing into, or out of, an operator station of large track-type tractors, such as elevated sprocket earthmoving equipment, uses a series of steps and grab handles. Typically, the steps and grab handles are parts of, or located on, the push arm, tilt cylinder, radiator guard, track, hood and engine enclosures, fenders, and cab. Often these steps and grab handles are not conveniently located. When added as ancillary components, they require separate operations to attach to the tractor during the assembly process. Additionally, the variously-located steps and grab handles are prone to damage during operation of the equipment.

Several structures have been proposed to overcome the problems associated with separately located steps and grab handles positioned at various locations on large equipment. For example, U.S. Pat. No. 4,243,120 issued Jan. 6, 1981 to Pratt, Jr., et al. for a RETRACTABLE BOARDING LADDER, and later granted U.S. Pat. No. 5,339,919 issued Aug. 23, 1994 to James W. Boyd, describe ladder arrangements which require counter weights, guide tracks, cables, and rollers to raise and lower the ladder. The counter weighted structures require constant maintenance and a large number of components. U.S. Pat. No. 4,131,293 issued Dec. 26, 1978 to John J. Kindle describes a ladder structure that is assisted by springs coupled with a complex linkage positioned at the rear of a farm implement. This structure also requires constant maintenance to assure operation of pivot points in the complex linkage.

U.S. Pat. Nos. 3,869,022 issued Mar. 4, 1975 to Harold J. Wallk, for a TELESCOPING STEP LADDER, and 5,033,582 issued Jul. 23, 1991 to Lawrence J. Hoben and entitled RETRACTABLE LADDER ASSEMBLY, are assigned to the assignee of the present invention. Both of the patents, along with U.S. Pat. No. 5,064,022 issued Nov. 12, 1991 to George W. Graham for LADDER APPARATUS AND METHOD FOR LARGE MOBILE EQUIPMENT, describe different telescoping arrangements whereby the ladder is moved between lowered and raised positions. Telescoping ladder arrangements, in general, require closely toleranced mating components.

The present invention is directed to overcoming the problems set forth above. It is desirable to have a ladder device which provides access to an operator station on a large track-type tractor that does not require complex linkage, cables, and other components that require extensive maintenance. It is also desirable to have such a ladder arrangement which does not require closely toleranced mating components. Furthermore, it is desirable to have such a ladder that, when in the carry position, is stored within a protective enclosure to avoid damage to the ladder during operation of the vehicle in a construction environment.

DISCLOSURE OF THE INVENTION

In accordance with one aspect of the present invention, a ladder assembly for providing access to, and egress from, an operator station of a track-type tractor includes a ladder support structure and a ladder pivotally attached to the ladder support structure. The ladder support structure has an elongated box portion having first and second ends, with the first end being an open end. The ladder support structure is pivotally attached to a side panel of a radiator guard of the track-type tractor. The ladder has a plurality of steps disposed between first and second ends. The ladder is movable between a first position at which the ladder is disposed within the elongated box portion of the ladder support structure and a second position at which the first end of the ladder is pivotally connected to the first end of the ladder support structure and the second end of the ladder is disposed at a position readily accessible from a ground surface on which the tractor is supported.

Other features of the ladder assembly embodying the present invention include the ladder support structure being selectively movable between a first position at which the elongated box portion of the ladder support structure is disposed in a substantially horizontal position, and a second position at which the elongated box portion is substantially vertically disposed at a position adjacent the side panel of the radiator guard of the track-type tractor.

Additional features of the ladder assembly embodying the present invention include the ladder assembly having a means for maintaining the ladder support structure at the first position whereat the elongated box portion of the ladder support structure is disposed in a substantially horizontal position. Still other features include the ladder, when disposed at the second, or extended position, being in a vertically inclined position and extending over a tilt cylinder and a push arm of the tractor.

BRIEF DESCRIPTION OF THE DRAWINGS

A more complete understanding of the structure of the present invention may be had by reference to the following detailed description when taken in conjunction with the accompanying drawings, wherein.

BEST MODE FOR CARRYING OUT THE INVENTION

Figure 1:
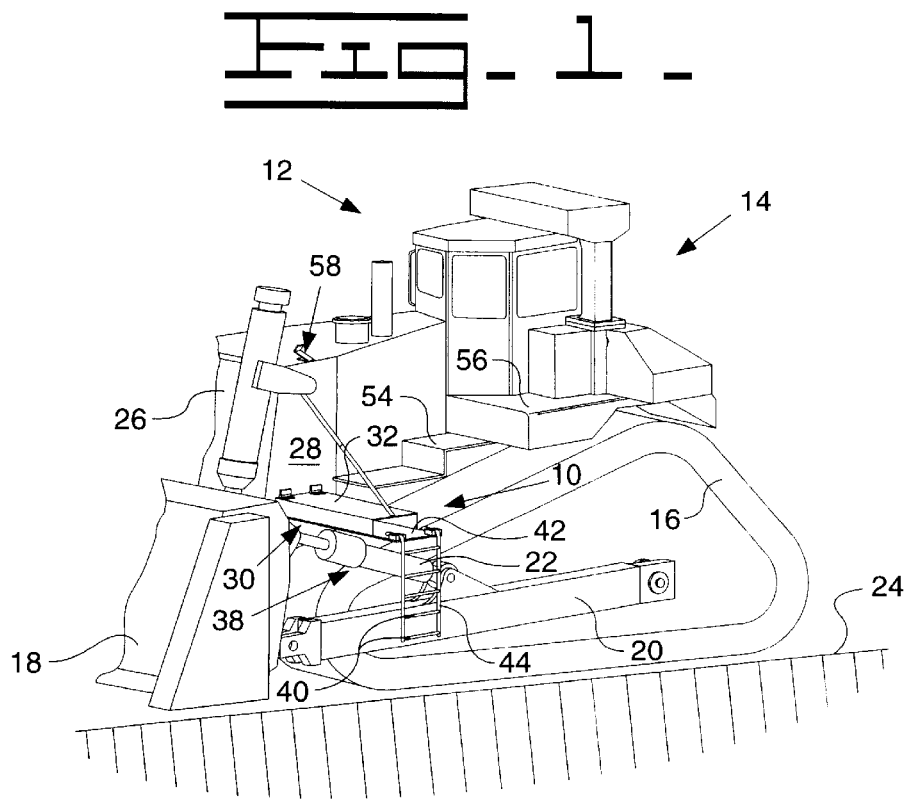
FIG. 1 is a three-dimensional view of a track-type tractor having a ladder assembly embodying the present invention, showing the ladder assembly in a lowered, or access, position.

A ladder assembly embodying the present invention is generally indicated in the drawings by the reference numeral 10. The ladder assembly 10 is specifically adapted to provide access to, and egress from, an operator station 12 of a large track-type tractor 14. In the illustrated embodiment, the track-type tractor 14 is an elevated sprocket tractor having a pair of continuous track assemblies 16 (one of which is shown in the drawings) an earthmoving implement 18, such as the illustrated bulldozer blade, mounted on a front portion of the tractor 14, a push arm 20 pivotally attached to an undercarriage portion of the tractor 14 at one end and pivotally attached to the earthmoving implement 18 at the other end. A tilt cylinder 22 extends between an intermediate portion of the push arm 20 and an upper portion of the blade 18 to provide tilt control of the blade 18 with respect to a ground surface 24 on which the tractor 14 is supported. The tractor 14 also has a radiator guard 26 having side panels 28 (one of which is shown in the drawings). As illustrated in the drawings, the side panel 28 is generally disposed on the tractor 14 at a position elevationally above the track assembly 16, the push arm 20, and the tilt cylinder 22.

The ladder assembly 10 includes a ladder support structure 30 having an elongated box portion 32 with a first end 34 and a second end 36. The first end 34 is an open end adapted to slidably receive a ladder 38 therein. The second end 36 of the elongated box portion 32 of the ladder support structure 30 is a closed end pivotally attached to the side panel 28 of the radiator guard 26.

Figure 3:
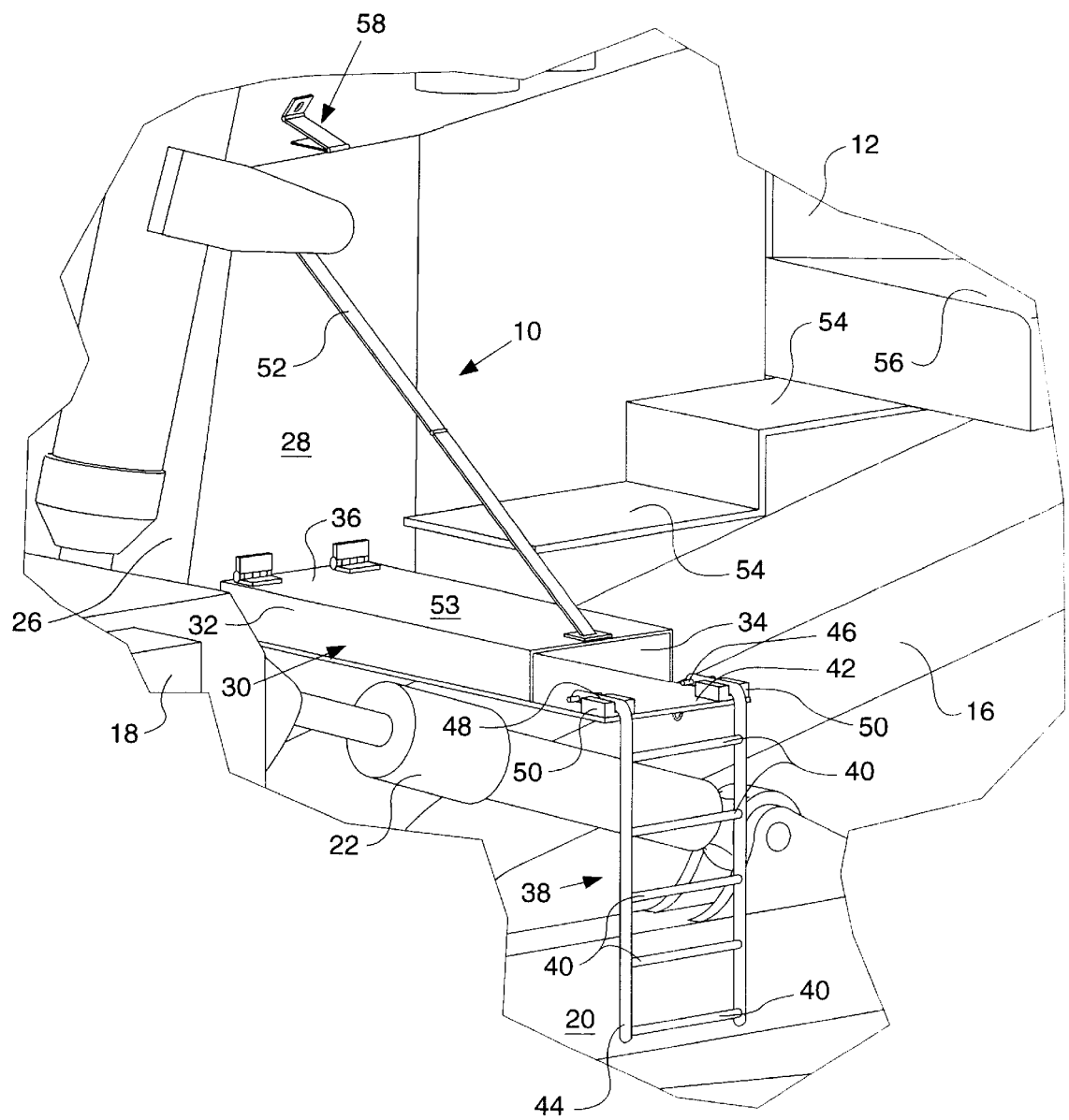
FIG. 3 is an enlarged three-dimensional view of a portion of a track-type tractor showing the ladder assembly embodying the present invention in greater detail.

The ladder assembly 10 further includes the ladder 38 that is slidably storable within the elongated box portion 32 of the ladder support structure 30. The ladder 38 has a plurality of steps 40 disposed between a first end 42 and a second end 44. As best shown in FIG. 3, the first end 42 of the ladder 38 is selectively pivotally attached to the first end 34 of the elongated box portion 32 of the ladder support structure 30. In the illustrated embodiment, the selective pivotal attachment is provided by pins 46 that extend outwardly from each side of the first end 42 of the ladder 38 and engage a respective groove 48 provided in a grooved block 50 attached at the sides of the first end 34 of the elongated box portion 32. Thus, as the ladder 38 is withdrawn, or extended, from the elongated box portion 32, the pins 46 engage respective one of the grooves 48 and permit the ladder 38 to pivot downwardly to its extended, or inclined, access position as illustrated in FIGS. 1 and 3.

At the extended, or inclined, access position the second end 44 of the ladder 38 is disposed at a position whereat the lower step 40 is readily accessible from the ground surface 24. Also, as illustrated in FIGS. 1 and 3, when the ladder 38 is at its second, or extended position, the ladder support structure 30 extends over the track 16, and the ladder 38 extends over the push arm 20, and the tilt cylinder 22, thus negating the need for an operator, or other person ascending to the operator station 12, to climb on the push arm, tilt cylinder, or track assembly to gain access to the operator station 12.

Figure 2:
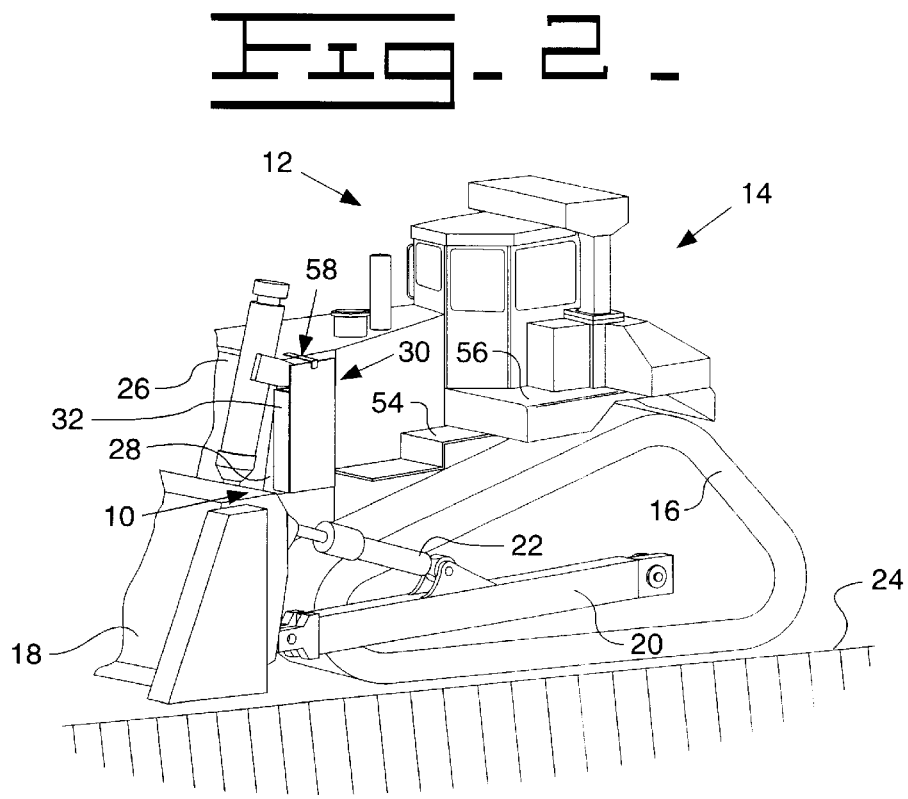
FIG. 2 is a three-dimensional view of a track-type tractor having a ladder assembly embodying the present invention, showing the ladder assembly in a raised, or carry, position.

As noted above, the ladder support structure 30 is pivotally attached to the side panel 28 of the radiator guard 26. The ladder support structure 30 is thus pivotally movable between a first position, as illustrated in FIGS. 1 and 3, where the elongated box structure 30 is disposed in a substantially horizontal position extending over the tracks 16, and a second position as illustrated in FIG. 2 whereat the elongated box section 32 is disposed in a substantially vertical position adjacent the side panel 28 of the radiator guard 26. The first, or horizontal, position of the elongated box section 32 is desirably elevationally controlled by a foldable diagonal brace 52 that extends between the side panel 28 of the radiator guard 26 and the elongated box portion 32 of the ladder support structure 30. The diagonal brace limits the pivoted movement of the elongated box portion 32 to stop the pivoted motion at the desired horizontal position, and folds to permit the pivoted movement of the elongated box portion 32 to the second, or carry, position adjacent the side panel 28. In the illustrated embodiment, when the elongated box portion 32 is at the horizontal position, the upper surface of the elongated box portion 32 serves as a platform 53 that provides a walkway over the track 16. To provide further access to the operator station 12, a stationary walkway 54 extends from the platform 53 over the track assembly 16 and along the engine compartment to a fender 56 of the tractor 14.

As shown in FIG. 2, the ladder 38 is stored inside the elongated box portion 32 of the ladder support structure 30 when the ladder support structure is raised to its carry position. The ladder 38 may be retracted into the box portion 38 by sliding. If so desired, the retraction and withdrawal of the ladder 38 may be aided by rollers mounted on the side rails of the ladder 38 or within the box portion 38 of the ladder support structure 30. The ladder support structure 30 is maintained at its raised, or carry, position by a suitable latch or locking mechanism, such as the latch 58 illustrated in FIG. 3.

The ladder assembly 10 thus forms a relatively lightweight structure that can be manually raised and lowered between its access and carry positions. However, if so desired, electrically or hydraulically powered auxiliary mechanical components, such as linear actuators, geared drive arrangements, or gas struts, could be used to move the ladder assembly 12 between its carry and access positions.

INDUSTRIAL APPLICABILITY

The ladder assembly 10 embodying the present invention provides a fold-down platform 53 over the track 16 of a large track-type tractor 14, and steps 40 that swing down from the platform 53 to provide access over the push arm 20 and tilt cylinder 22 of the tractor 14. The platform 53 further provides access to a stationary walkway 54 above the track assembly 16 that extends from the ladder support structure 30 to a fender 56 of the tractor 14, and thence along the fender 56 to an operator station 12.

Advantageously, when the ladder assembly 10 is in its raised, or carry position, the ladder 38 is substantially enclosed within the elongated box portion 32 of the ladder support structure 30, thus protecting the ladder 38 during operation of the tractor 14.

The ladder assembly 10, is pivotally attached at the lower end of the ladder support structure 30 to the side panel 28 of the radiator guard 26. When in the access position, illustrated in FIGS. 1 and 3, the ladder support structure 30 is positioned horizontally above the track 16 and extends between the side panel 28 of the radiator guard 26 and the tilt cylinder 22. When the ladder 28 is withdrawn from the elongated box portion 32 of the ladder support structure 30, and pivoted downwardly to its inclined position, it is disposed at a slight angle to vertical along the side of the tilt cylinder 22 and the push arm 20. Thus, the ladder assembly 10 provides easy access over the exposed push arm 20, tilt cylinder 22, and track 16 to the stationary walkway 44 and subsequent access to the operator station 12.

Although the present invention is described in terms of a preferred exemplary embodiment, with illustrative examples of a latch mechanism for maintaining the ladder support structure 30 in the raised, or carry, position and an illustrative hinge arrangement for pivotally connecting the ladder 38 to the ladder support structure 30, those skilled in the art will recognize that other latch mechanisms and pivot connections may be employed without departing from the spirit of the invention. Such changes are intended to fall within the scope of the following claims. Other aspects, features, and advantages of the present invention may be obtained from a study of this disclosure and the drawings, along with the appended claims.

What is claimed is:

1. A ladder assembly providing access to, and egress from, an operator station of a track-type tractor having an earthmoving implement mounted on a front portion of the tractor, a push arm attached to said implement, a tilt cylinder extending between said push arm and said implement, and a radiator guard having a side panel disposed on said tractor at a position elevationally above said tilt cylinder and said push arm, said ladder assembly comprising:

a ladder support structure having an elongated box portion with an open first end and a closed second end, said ladder support structure being pivotally attached to said side panel of the radiator guard at said second end of the ladder support structure; and a ladder having a plurality of steps disposed between spaced apart first and second ends of the ladder, said ladder being movable between a first position at which the ladder is disposed within the elongated box portion of the ladder support structure and a second position at which the first end of the ladder is pivotally connected to the first end of the ladder support structure and the second end of the ladder is disposed at a position readily accessible from a ground surface on which the tractor is supported.

2. A ladder assembly, as set forth in claim 1, wherein said ladder support structure is selectively movable between a first position at which said elongated box portion is disposed in a substantially horizontal position extending over a track of said track-type tractor and a second position at which said elongated box portion is substantially vertically disposed at a position adjacent said side panel of the radiator guard.

3. The ladder assembly, as set forth in claim 2, wherein said ladder assembly includes a means for maintaining said ladder support structure at said first position at which the elongated box portion of the ladder support structure is disposed in a substantially horizontal position.

4. The ladder assembly, as set forth in claim 3, wherein said means for maintaining said ladder support structure at said first position includes a foldable diagonal brace extending between said side panel of the radiator guard and said elongated box portion of the ladder support structure.

5. The ladder assembly, as set forth in claim 1, wherein when said ladder is disposed at said second position, the ladder is in a vertically inclined position and extends over the tilt cylinder and the push arm of the tractor.

* * * * *